Jan. 3, 1928.
J. E. THORNTON
1,655,299
CINEMATOGRAPH PROJECTION APPARATUS
Filed Feb. 1, 1927      2 Sheets-Sheet 1
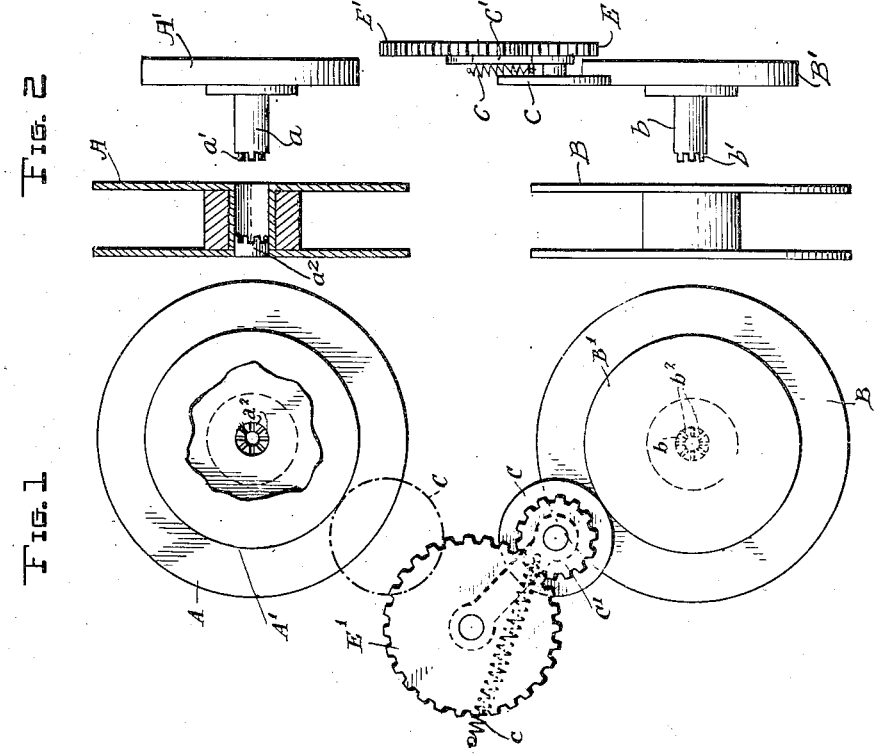
Inventor
John Edward Thornton,
By
Attorney

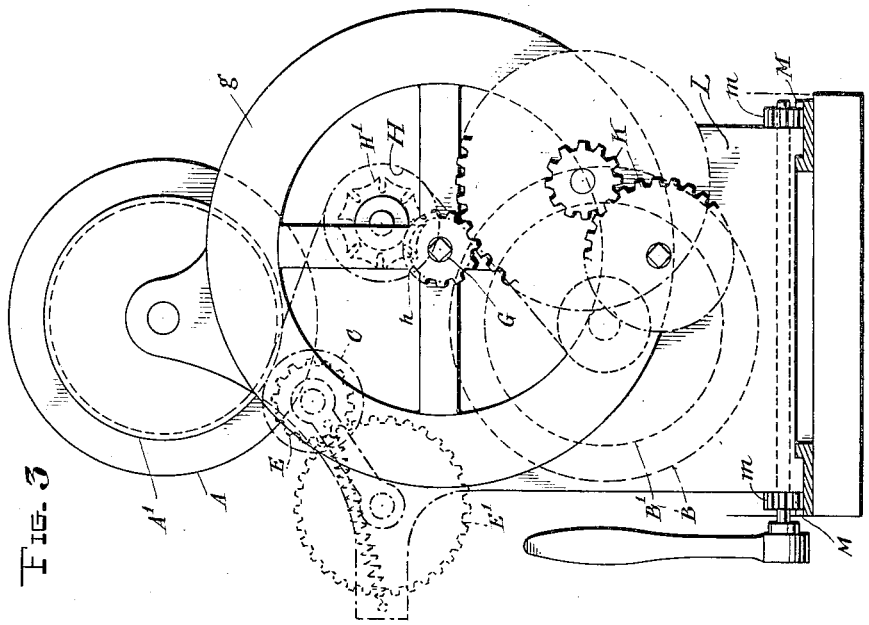

Patented Jan. 3, 1928.

1,655,299

UNITED STATES PATENT OFFICE.

JOHN EDWARD THORNTON, OF WEST HAMPSTEAD, LONDON, ENGLAND.

CINEMATOGRAPH PROJECTION APPARATUS.

Application filed February 1, 1927, Serial No. 165,232, and in Great Britain December 11, 1925.

This invention relates to improvements in driving mechanism for projectors for exhibiting cinematograph (motion) pictures or stationary (series) pictures which are printed upon continuous film ribbons.

The object of the invention is to obtain a to and fro movement of the film and insure the even feeding or winding of the film upon either spool or reel, there being provided means to permit the slipping action between the driving means that insures this as the diameter of the spool increases as the increasing convolutions of the film are wound thereon; the speed being the same in either direction for a film of the reversible type, or the re-winding operation may be speeded up by the operator by rotating the operating handle in a reverse direction and at a greater speed than when exhibiting.

The invention consists in driving either the reel or spool alternately by a common driving wheel brought into contact with either the reel or spool, the drive being a friction wheel drive. It consists further in providing for slip in either the reel or spool according as their varying diameters have to be allowed for to follow the definite and positive feed of the film, (either from the spool on to the reel or from the reel on to the spool) the positive feed of the film being controlled by the usual film-advancing and loop-forming means which are independent of the reeling or spooling devices.

The invention will be described with reference to the accompanying drawings in which it is shown for use with a film of the reversible type. In these drawings:—

Fig. 1 is a side view of one form of the drive.

Fig. 2 is an end view of same.

Fig. 3 is a side view of same with the side of the casing removed to show the drive.

In the form of the invention shown in Figs. 1 and 2 a disc plate $A^1$ is mounted on one end of a spindle $a$. The other end of the spindle $a$ is provided with crown teeth $a^1$ adapted to engage with corresponding teeth $a^2$ in the core of the spool A when the latter is placed on the spindle $a$. A similar disc or plate $B^1$ is mounted on the end of a spindle $b$, the other end of which is provided with crown teeth $b^1$ adapted to engage with corresponding teeth $b^2$ on the core of the reel B when the latter is placed on the spindle $b$.

A friction disc C is carried on a swinging arm $C^1$ so that it can be brought into contact with one or other of the discs $A^1$ or $B^1$ to rotate the spool A or the reel B, a spring $c$ holds the disc C in contact with the disk $A^1$ or the disc $B^1$. A gear wheel E is secured to the disc C and this wheel E is driven by a second gear wheel $E^1$ receiving motion from the main drive of the projector so that motion is imparted through the wheels $E^1$, E and disc C to one or other of the discs $A^1$ or $B^1$. The spool A or the reel B according as to which is being driven will be driven so long as the film is slack but will slip as the film tightens.

After the film has been wound from the spool A on to the reel B to reverse the motion to rewind it again on the spool A it is only necessary to swing the arm $C^1$ over so that the disc C moves from contact with the disc $B^1$ driving the reel B into contact with the disc $A^1$ driving the spool A, the operating handle (not shown) being operated in a reverse direction and at a greater speed than when exhibiting, or the handle may be attached to the spindle G and operated to rotate said spindle clockwise, as shown in Figure 3, so that the film will be re-wound upon the reel A.

A crown wheel $a^2$ or $b^2$ as previously described is built into the hole in the spool core, so that when the spool A or reel B is placed to turn upon the spindle $a$ or $b$, the latter can be placed upon a projecting driving spindle which forms part of the projector itself. The end of this spindle $a$ or $b$ is provided with another crown wheel $a^1$ or $b^1$ corresponding to that inside the spool core, so that when the two interlock the spool is clutched upon and driven by the spindle.

As shown in Fig. 3 the gear wheel E driving the friction disc C is driven from the main driving shaft G on which a fly wheel $g$ may be mounted. The shaft G also drives the film feeding drum H through a pin wheel $h$ and Maltese cross $H^1$. The drum H is double or single width as desired according to the type of film with which it is to be used. Instead of driving a drum H the shaft G may actuate any ordinary or usual type of grip mechanism for feeding forward the film.

The shaft G is driven by a handle (not shown) through the gearing K so that it will make sixteen revolutions per second when the projector is exhibiting cinematograph pictures. Or it is driven by changing the handle on to the end of the shaft G so that it will only make one or two revolutions per second for use when exhibiting series (non-motion pictures).

When the drum H is of double-width all the gearing is mounted in a frame L which can be moved laterally by the pinion m gearing with the rack M to bring one or other series of the apertures in the drum opposite the projecting lens which is mounted on a bracket fixed to the base of the machine and is not movable.

What I claim as my invention and desire to protect by Letters Patent is:—

The combination in a motion picture projector of the crank driven type, of a frame, a supply reel, a receiving reel, means for intermittently advancing the film in both directions, and means for rotating the reels selective at will to connect either reel for driving action, said latter means including two friction disks, one fast to each reel, a pivoted spring biased arm, a third friction disk carried thereby and adapted to frictionally engage either one of the first-mentioned friction disks at a time, and means for operably connecting the last friction disk with the film-advancing means, whereby either reel can be rotated through the film-advancing means and the friction disks to wind the film thereupon.

In testimony whereof I have hereunto set my hand.

JOHN EDWARD THORNTON.